(12) United States Patent
Taylor

(10) Patent No.: US 10,969,051 B2
(45) Date of Patent: *Apr. 6, 2021

(54) TOP HAT LINER HAVING INTEGRATED THERMOPLASTIC WITH IMPROVED MELT-FLOW CHARACTERISTICS FOR CONNECTION OF MAIN AND LATERAL PIPES IN CURED IN PLACE PIPE SYSTEMS AND ASSOCIATED METHOD OF USE

(71) Applicant: Infrastructure Technologies, LLC, Lafayette, CA (US)

(72) Inventor: Joseph Taylor, Brainerd, MN (US)

(73) Assignee: Infrastructure Tecnologies, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/266,005

(22) Filed: Feb. 2, 2019

(65) Prior Publication Data

US 2019/0249811 A1    Aug. 15, 2019

Related U.S. Application Data

(60) Provisional application No. 62/630,868, filed on Feb. 15, 2018.

(51) Int. Cl.
*F16L 55/16*   (2006.01)
*F16L 55/165*  (2006.01)

(52) U.S. Cl.
CPC ....... *F16L 55/1654* (2013.01); *F16L 55/1656* (2013.01)

(58) Field of Classification Search
CPC .......................... F16L 55/1654; F16L 55/1656

USPC ............................................................ 138/98
See application file for complete search history.

(56) References Cited

U.S. PATENT DOCUMENTS

| 6,708,729 | B1* | 3/2004 | Smith | F16L 55/1651 |
| | | | | 138/124 |
| 7,073,536 | B2* | 7/2006 | Blackmore | B29C 63/0069 |
| | | | | 138/97 |
| 7,267,739 | B2* | 9/2007 | Blackmore | E03F 3/06 |
| | | | | 138/97 |
| 9,086,183 | B2* | 7/2015 | Fyfe | F16L 55/165 |
| 9,347,212 | B2* | 5/2016 | Bichler | E03F 7/12 |
| 9,353,900 | B2* | 5/2016 | Bichler | F16L 55/1656 |
| 9,689,522 | B2* | 6/2017 | Bichler | F16L 55/1651 |
| 2007/0003648 | A1* | 1/2007 | Weatherby | F16L 55/1653 |
| | | | | 425/11 |
| 2008/0277012 | A1* | 11/2008 | Anders | F16L 55/1651 |
| | | | | 138/98 |
| 2009/0194184 | A1* | 8/2009 | Kiest, Jr. | F16L 55/1656 |
| | | | | 138/98 |
| 2012/0312407 | A1* | 12/2012 | Muhlin | F16L 55/179 |
| | | | | 138/98 |
| 2014/0116557 | A1* | 5/2014 | Bichler | B32B 27/12 |
| | | | | 138/98 |

(Continued)

*Primary Examiner* — Craig M Schneider
*Assistant Examiner* — David R Deal
(74) *Attorney, Agent, or Firm* — Carla Gannon Law

(57) ABSTRACT

A flexible top hat for use in the pipe junction between a main pipe and lateral pipe is used in conjunction with a CIPP system, and is preferably constructed of material having a melt/flow point, cure point and bonding point temperature and pressure that is substantially similar to the CIPP. The CIPP system and top hat are cured together to form a unitary structure.

3 Claims, 4 Drawing Sheets

(56) References Cited

U.S. PATENT DOCUMENTS

2015/0068632 A1\* 3/2015 Onishi .................... B29C 63/34
138/97

\* cited by examiner

FIG. 1 – PRIOR ART

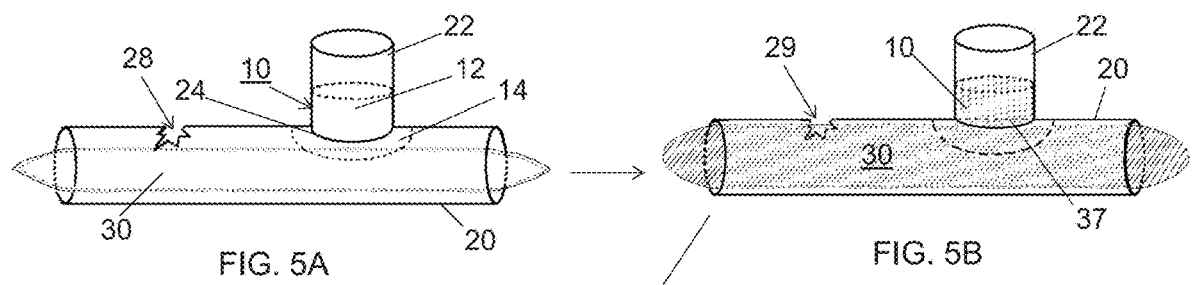
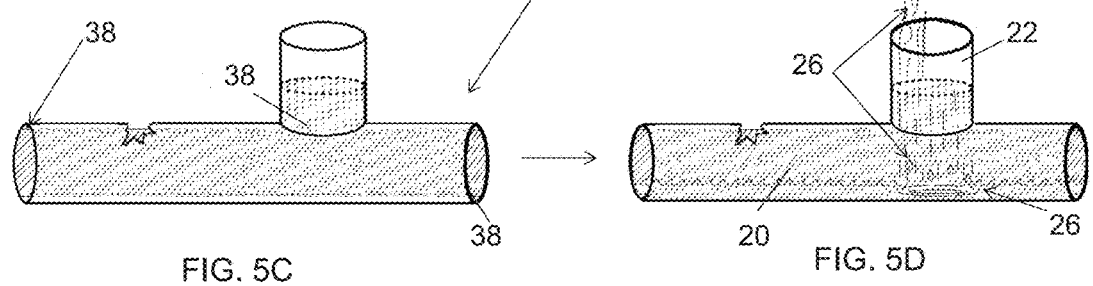
FIG. 5

TOP HAT LINER HAVING INTEGRATED THERMOPLASTIC WITH IMPROVED MELT-FLOW CHARACTERISTICS FOR CONNECTION OF MAIN AND LATERAL PIPES IN CURED IN PLACE PIPE SYSTEMS AND ASSOCIATED METHOD OF USE

CROSS-REFERENCE TO RELATED APPLICATION

This application claims the priority of U.S. Provisional Patent Application Ser. No. 62/630,868, entitled TOP HAT LINER HAVING INTEGRATED THERMOPLASTIC WITH IMPROVED MELT-FLOW CHARACTERISTICS FOR CONNECTION OF MAIN AND LATERAL PIPES IN CURED IN PLACE PIPE SYSTEMS AND ASSOCIATED METHOD OF USE, which was filed Feb. 15, 2018. The aforementioned provisional application is hereby incorporated by reference in its entirety.

BACKGROUND OF THE INVENTION

The present invention relates to pipe repair and reinforcement, and more specifically, to liners for connecting main and lateral pipes in cured in place pipe systems.

Many underground and underwater pipe systems, such as potable drinking water, sewage, storm drains, oil, gas and other petroleum product lines, and supply lines for specific industries such as pulp and paper mills are critically deteriorated or damaged and in need of repair. Replacing pipe and/or pipe sections can be achieved in a variety of ways including digging to access the pipe, removal of the old pipe, putting in new pipe, and tying new pipe into existing structures; and various trenchless pipe repair methods. Of the trenchless pipe repair systems, Cured In Place Pipe ("CIPP") technologies have shown great promise.

An improved CIPP system developed by the inventor(s) of the current application is disclosed in U.S. patent application Ser. No. 15/614,852, filed Jun. 6, 2017, entitled CURED IN PLACE PIPE SYSTEM HAVING INTEGRATED THERMOPLASTIC WITH IMPROVED MELT-FLOW CHARACTERISTICS. This application claims the benefit of U.S. Provisional Patent Application 62/357,796, filed on Jul. 1, 2016. Both of these references are hereby incorporated by reference in their entirety.

The aforementioned improved CIPP system includes a flexible tubular substrate comprised of fibers of carbon, aramid and thermoplastic which have been needle punched together and formed in a tube of overlapping layers that can circumferentially expand to accommodate the size and shape of the host pipe. An outer plastic film encapsulates the tubular structure to protect it from contamination by the host pipe during installation. The thermoplastic has a melt/flow point of approximately 300-342° F., a cure point of approximately 330-370° F., and a bonding point of approximately 372-412° F. at approximately 5-20 psi.

In use, the uncured CIPP system is introduced into the host pipe, an internal bladder is pumped with hot air, the tubular substrate's thermoplastic melts, carbon and aramid fibers bond, and the thermoplastic cures. After curing, the bladder is removed, ends of the cured lining system are cut, and the newly reinforced portions are connected to the existing upstream and downstream host pipe. Pipe flow can then be resumed. This is generally depicted in FIGS. 1A through 1E.

Most pipe systems have a main pipe and multiple lateral pipes projecting off of the main pipe, for example the "water main" and associated "water laterals" respectively. In repairing a host pipe the CIPP often traverses the junction with at least one other pipe. Said another way, CIPP will form a barrier between the junction of a main pipe and a lateral pipe if lateral pipes are projecting off the segment of main pipe that is repaired/reinforced. This is remedied by cutting out the section of CIPP that obstructs the junction.

These "cut out" junctions can be problematic. Issues include diameter differentials between CIPP enhanced pipe and unmodified pipe; "ragged" sections of CIPP arising from cutting; disruption of seal between host pipe and CIPP at perimeter of cut out section; and variances in properties such as flexibility, heat expansion profiles, and so forth between CIPP enhanced pipe and unmodified pipe.

Top hat liners, also called T-liners, are employed in a variety of applications to smooth the transition between main and lateral pipes, including the junctions between CIPP enhanced pipe segments and unmodified pipe segments. However, known top hat liners are typically a "patch" that are positioned onto a junction having a cut section, and secured using polyester, vinyl ester, or epoxy. Vinyl ester and epoxy are widely used because they can be cured in ambient conditions in 7-10 minutes. A polyester UV resin capable of being cured in approximately 7-10 minutes with a UV light is also known. Both of these methods are secured with a thermoset resin. More specifically, once the top hats have been saturated with resin, they are placed on a bladder that is pulled down the main pipeline, and then inflated after the top hat is in position, thereby pushing the planar portion against the inner diameter of the liner and inflating the tubular section inside the lateral until the top hat cures. These methods require multiple time-consuming steps, introduce yet another material with different properties into the structure, and simply "cover up" a potentially vulnerable region of the pipe infrastructure.

As can be seen, there is a need for a top hat that is easy to use with CIPP systems. It is desirable that the top hat employs the same material as the underlying CIPP system employed. It is also desirable that the top hat permanently integrates with the existing CIPP system.

SUMMARY OF THE INVENTION

A flexible top hat is used for the pipe junction between a main pipe and lateral pipe in order to facilitate a smooth transition. The top hat is preferably used in conjunction with a CIPP system, and is preferably constructed of material having a melt/flow point, cure point and bonding point temperature and pressure that is substantially similar to the CIPP. The CIPP system and top hat are cured together to form a unitary structure.

The top hat generally includes a tubular portion that joins with a planar portion at an interface. The size, shape, dimensions and orientation of the top hat can vary according to the desired application.

The top hat is preferably constructed of a substrate including a plurality of carbon, aramid and thermoplastic fibers that are needle punched together.

One method of manufacturing a top hat employs a mandrel of the desired diameter, and a machine that weaves or needle punches the substrate around the shape of this mandrel to form the tubular portion. Next, the planar portion is attached to the tubular portion to form the top hat.

In a preferred method of using the top hat, uncured and flexible CIPP is inserted into a main pipe having a compromised portion. An uncured and flexible top hat is inserted into the pipe junction with the tubular portion extending upwardly into the lateral pipe, and the planar portion extending downwardly into the main pipe.

Next, the CIPP and top hat are cured. Curing is preferably achieved by blowing superheated hot air at a temperature, pressure and duration adequate for curing.

Post-curing, the CIPP has expanded to fit the main pipe, and has been cured to a hardened state, thereby creating a repaired portion. The top hat has likewise expanded, albeit to a lesser extent, and cured to a hardened state. In the curing process the CIPP and the top hat have physically and chemically bonded with each other, thereby forming a unitary structure of significant strength within the pipe junction.

Extraneous portions are removed and various finishing steps are performed. The final result is that fluid entering the lateral pipe travels directly into the main pipe without undesirably entering space between the CIPP and the main pipe.

BRIEF DESCRIPTION OF THE DRAWINGS

FIG. 1 is depicts a CIPP repair according to the prior art with:
FIG. 1A showing a main pipe having a compromised portion;
FIG. 1B showing an uncured CIPP positioned in a main pipe;
FIG. 1C showing a cured CIPP within a main pipe;
FIG. 1D showing a cured CIPP with cut sections;
and
FIG. 1E showing a "repaired" CIPP with compromised junction;
FIG. 5 depicts a CIPP repaired with a top hat of the present invention with:
FIG. 5A showing a main pipe having a compromised portion with an uncured CIPP and a top hat of the present invention;
FIG. 5B showing a cured CIPP and cured top hat;
FIG. 5C showing a cured CIPP and top hat with cut sections;
and
FIG. 5D showing a repaired CIPP with junction enforced with top hat of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various figures:
10—Top hat liner;
12—Tubular portion;
14—Planar portion;
16—Interface;
20—Main pipe;
22—Lateral pipe;
24—Pipe junction;
26—Fluid;
28—Compromised portion;
29—Repaired portion;
30—Cured In Place Pipe (CIPP);
31—Substrate;
32—Fibers;
34—Needle punch;
37—Wall; and
38—Cut section.

Broadly, the present invention is a flexible top hat for use in the pipe junction between a main pipe and lateral pipe. The top hat is preferably used in conjunction with a CIPP system, and is preferably constructed of material having a melt/flow point, cure point and bonding point temperature and pressure that is substantially similar to the CIPP. The CIPP system and top hat are cured together to form a unitary structure.

Figure 1:
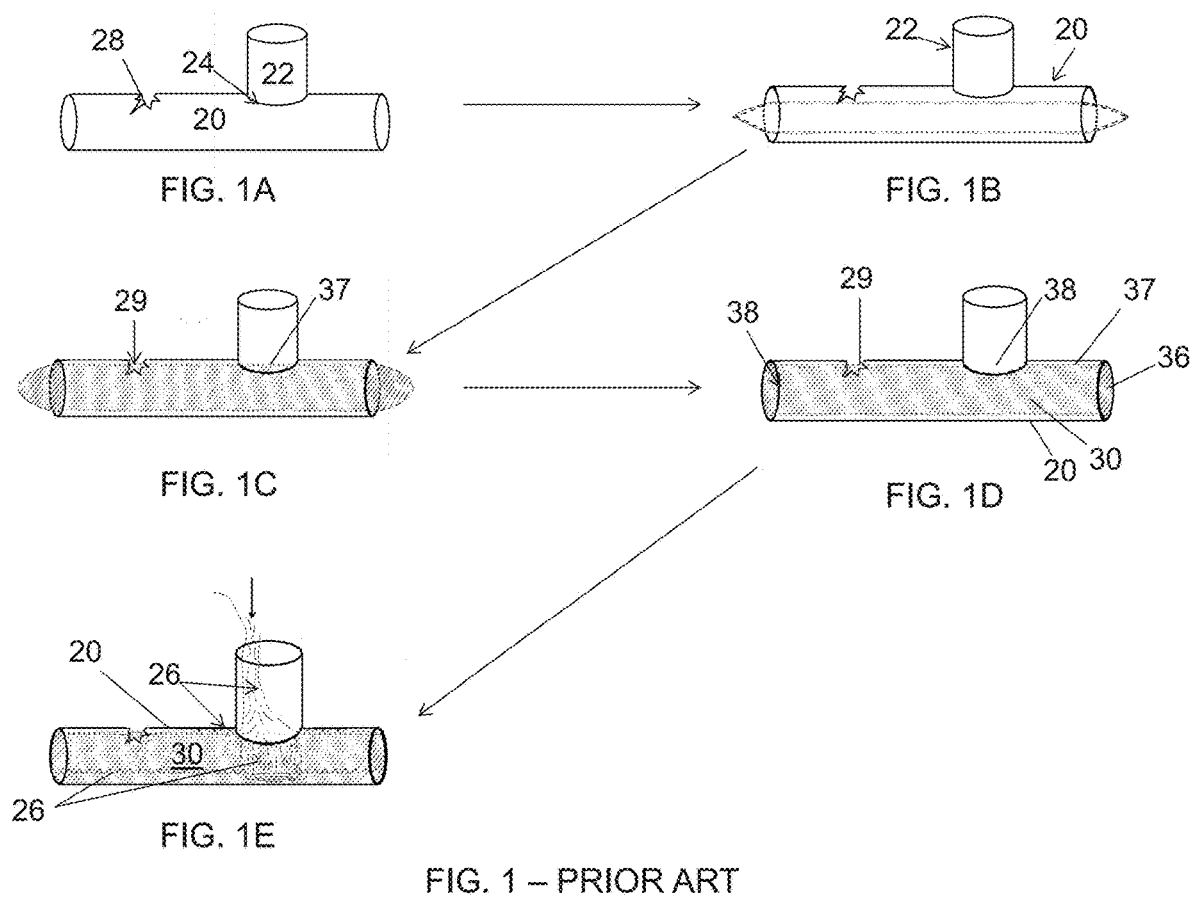

Referring to prior art depicted in FIG. 1, FIG. 1A shows main pipe 20 having segment of lateral pipe 22 projecting upwardly, with compromised portion 28 requiring repair. As shown in FIG. 1B, CIPP 30 is positioned within main pipe 20. FIG. 1C depicts CIPP 30 expanded and cured within main pipe 20, thereby repairing compromised portion 28, and reinforcing segment of main pipe. Note that cured CIPP 30 undesirably cordons off main pipe 20 from lateral pipe 22 at wall 37 of pipe junction 24. FIG. 1D depicts removal of CIPP removed from both ends of main pipe 20, as well as wall 37 of junction 24, thereby leaving cut sections 38. FIG. 1E shows CIPP repaired with CIPP during use. Note that some fluid 26 traveling downward in lateral pipe 22 leaks between CIPP 30 and junction 24. This is problematic for a variety of reasons including soil contamination, and because a flowing leak could create a hydrostatic pressure build up beyond the strength of the liner, thereby causing the liner to fail.

Figure 2:
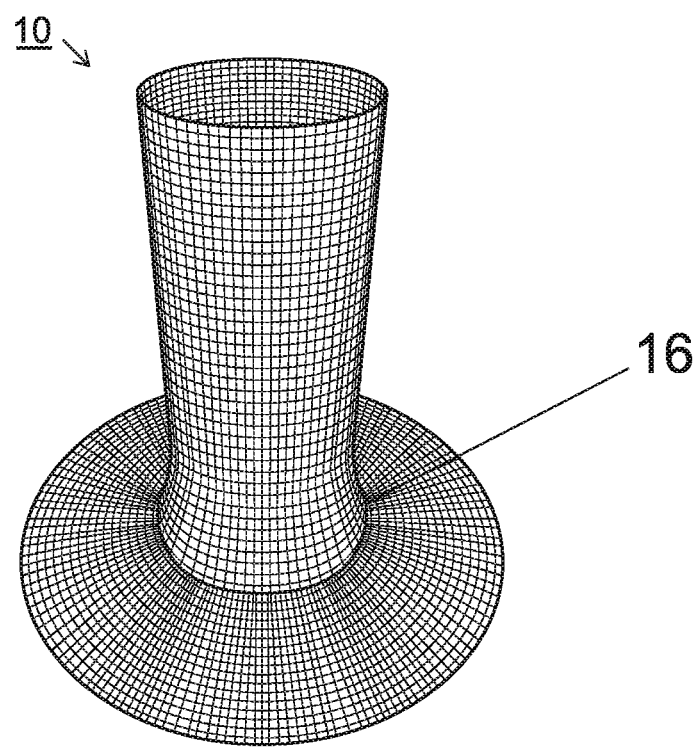
FIG. 2 is a photograph of a top hat of the present invention.
Figure 3:
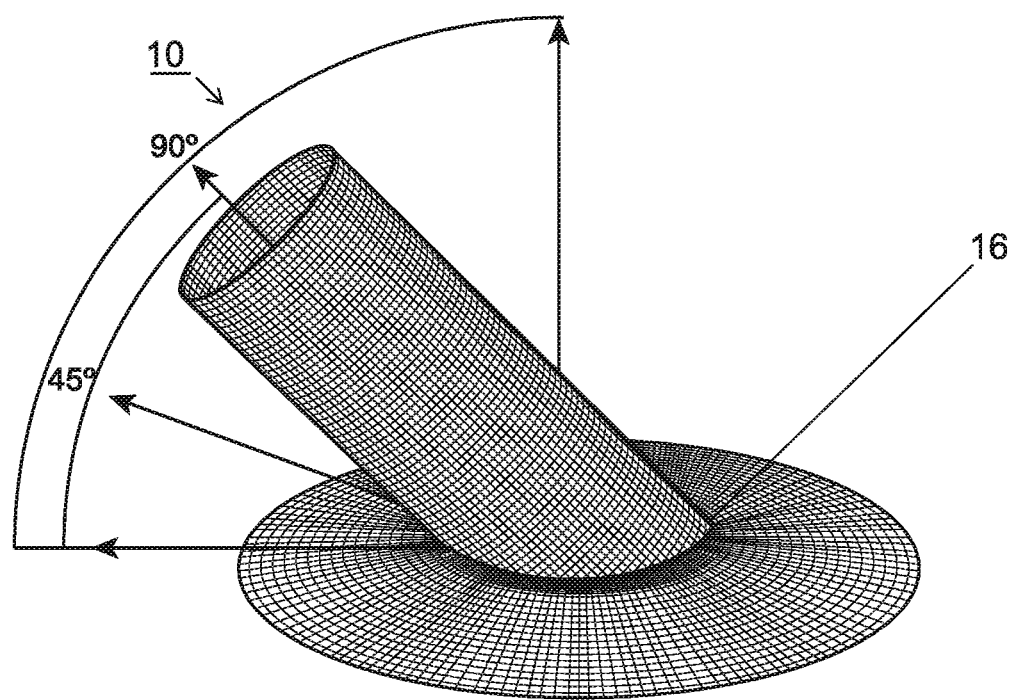
FIG. 3 is a schematic representation of a top hat according to an alternative embodiment.

FIG. 2 depicts one embodiment of top hat 10 including tubular portion 12 that joins with planar portion 14 at interface 16. The size, shape, dimensions and orientation of top hat 10 can vary according to the desired application. By way of example, referring to FIG. 3, tubular portion 12 of top hat 10 is angular with respect to planar portion 14. In this embodiment interface 16 would be an ellipse. Preferably, tubular portion 12 is approximately 1 inch to approximately 100 feet long or as desired according to intended length of the lateral repair, measured along longest side; diameter of tubular portion is approximately 1 to approximately 18 inches, although other sizes are possible and within the scope of this invention; planar portion 14 is approximately 1 to approximately 24 inches from edge to edge or as desired according to the required top hat design; and angle between tubular portion and planar portion is approximately 0° to approximately 90° or from approximately 90 degrees to approximately 180 degrees respectively.

Figure 4:
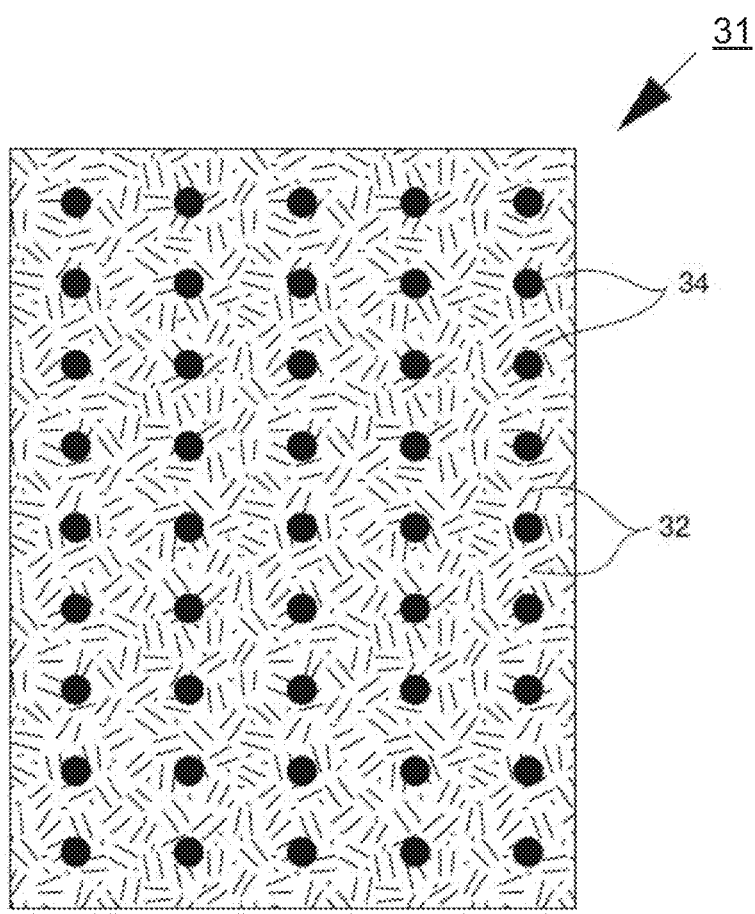
FIG. 4 depicts the substrate used to construct a top hat of the present invention.

Top hat 10 is preferably constructed of substrate 31, which is depicted in FIG. 4. Substrate 31 includes a plurality of carbon, aramid and thermoplastic fibers 32 needle punched 34 together, with each fiber being preferably approximately 1" to 4" long, and approximately 0.31 mm to 1 mm thick. An example of a commercially available carbon fiber suitable for use is Tenax UMS40 from Toho Tenax of Rockwood, Tenn. The aramid fibers preferably have a length of approximately 1" to 4", and thickness of approximately 0.31 mm to 1 mm. An example of a commercially available aramid fiber suitable for use is KEVLAR K29 AP from DuPont of North America. The thermoplastic fibers preferably have a length of approximately 6 mm to 2500 mm, and thickness of approximately 0.31 mm to 1 mm. The thermoplastic of the present invention is preferably polypropylene, with an example of a commercially available polypropylene thermoplastic being Hyperform HPN-68L from Milliken of Spartanburg, S.C., USA having approximately 309 to 400 degree melt and cure points at a pressure of approximately 5 to 20 psi.

The proportion of carbon fibers in substrate 31 is approximately 10 to 60% by weight. The proportion of aramid fibers in substrate 31 is approximately 0 to 15% by weight. The preferred proportion of fibers in substrate 31 is approximately 40% carbon, 0% aramid, and 60% thermoplastic, by weight.

Fibers are needle punched 34 together by conventional methods in a directional format. However, other combinations are also suitable. Substrate 31 can be produced in a variety of thicknesses, typically approximately 1.5 mm-9.0 mm, as appropriate for the specific application.

One method of manufacturing a top hat employs a mandrel of the desired diameter, and a machine that weaves or needle punches the substrate around the shape of this mandrel to form tubular portion 12. Next, planar portion 14 is attached to the tubular portion to form top hat 10.

A preferred method of using top hat 10 is depicted in FIG. 5. Referring to FIG. 5A, uncured and flexible CIPP 30 is inserted into main pipe 20 having compromised portion 28. In addition, uncured and flexible top hat 10 is inserted into pipe junction 24 with tubular portion 12 extending upwardly into lateral pipe 22, and planar portion 14 extending downwardly into main pipe 20.

Next, CIPP 30 and top hat 10 are cured. Curing is preferably achieved by blowing superheated hot air at a temperature, pressure and duration adequate for curing. Although these parameters will vary a bit depending on application, specific composition of fibers in CIPP and top hat, and other factors, it is preferred that the air is approximately 380-470° F., at a pressure of approximately 5-20 psi, for approximately 5 to 90 minutes. The superheated hot air blowing parameters can be manipulated in order to achieve the desired chemical reactions. By way of example, the thermoplastic preferably has a melt/flow rate of approximately 320-322° F. at a pressure of 5 to 105 psi for 5 to 90 minutes; a cure point of approximately 350° F. at a pressure of 5 to 105 psi for 5 to 90 minutes; and the carbon and aramid preferably have a bonding temperature of approximately 392° F. at a pressure of 5 to 105 psi for 5 to 90 minutes. The temperature and pressure can be "held" at various levels as desired.

FIG. 5B depicts the post curing assembly where CIPP 30 has expanded to fit main pipe 20, and cured to a hardened state, thereby creating repaired portion 29. Top hat 10 has likewise expanded, albeit to a lesser extent, and cured to a hardened state. In the curing process CIPP 30 and top hat 10 have physically and chemically bonded with each other, thereby forming a unitary structure of significant strength within pipe junction 24. Note that CIPP 30 has undesirably sealed off lateral pipe 22 from main pipe 20 at wall 37.

FIG. 5C depicts the end result after extraneous portions of CIPP have been removed, including from both ends of main pipe, and wall 37. Cut sections 38 remain where extraneous CIPP was removed. Cutting and finishing is preferably accomplished using a side grinder with a diamond cutting disc and reciprocating saw, which leaves approximately 2 inches of liner protruding from the host pipe face. Section 37 is preferably cut by use of a robot with a camera on wheels or tracks with an approximately 800 foot umbilical cord connected to a vehicle with a control system that a technician uses to mobilize the robot into position. The technician uses the control system to control the robotic arm with a cutter bit to grind away and remove the dimple created by the liner due to the internal pressure pushing against the hole where the lateral or service line connects to the main. There are several types of cutter bits, but a router bit is most preferably used to cut out the circular shape of the lateral. As a second step, a wire brush bit may be installed in place of the router bit on the robot to brush away and remove the pieces left by the initial cut on the main line. After all the laterals or services have been reinstated, a cleaning head, basically a pressure washer, is pulled through the liner to blow all the leftover trimmings downstream for collection and disposal. After these steps, top hats are ready to be installed.

The final result of pipe repaired with CIPP and top hat of the present invention is depicted in FIG. 5D. Fluid 26 entering lateral pipe 22 travels directly into main pipe 20 without undesirably entering space between CIPP 30 and main pipe 20, as depicted in FIG. 1E.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, modifications may be made without departing from the spirit and scope of the invention as set forth in the following claims. It should be understood that all specifications, unless otherwise stated or contrary to common sense, are +/−10%, and that ranges of values set forth inherently include those values, as well as all increments between. Also it should be understood that "substantially" and the like should be construed to mean generally, but allowing for irregularities due to material or manufacturing differences, human variances, and so forth.

What is claimed is:

1. An uncured top hat for use with a cured in place pipe (CIPP) having needle punched tubular substrate including a plurality of integrated thermoplastic fibers, said tubular substrate constructed of multiple overlapping layers that aren't attached one to another, said uncured top hat comprised of a top hat substrate having a tubular portion joined with a planar portion at an interface, said top hat substrate constructed of plurality of carbon fibers, aramid fibers and thermoplastic fibers needle punched together, wherein said top hat substrate is curable upon the application of blown air at approximately 380-470° F., at a pressure of approximately 5-20 psi, for approximately 5 to 90 minutes, and wherein said tubular substrate and said top hat substrate are chemically and structurally bonded upon curing.

2. A pipe repair system including a cured in place pipe (CIPP) chemically and structurally bonded with a top hat, said CIPP including:
   A. A needle punched tubular substrate including a plurality of integrated thermoplastic fibers, said tubular substrate constructed of multiple overlapping layers that aren't attached one to another;
   B. A bladder surrounding said tubular substrate; and
   C. A film surrounding said tubular substrate,
   and wherein said CIPP and said top hat are constructed of substantially identical materials.

3. A method of repairing a pipe including the steps of:
   A. Inserting an uncured cured in place pipe (CIPP) into a main pipe having a compromised portion, said CIPP including a needle punched tubular substrate including a plurality of integrated thermoplastic fibers, said tubular substrate constructed of multiple overlapping layers that aren't attached one to another; a bladder surrounding said tubular substrate; and a film surrounding said tubular substrate;

B. Inserting a top hat into the junction between said main pipe and an adjoining lateral pipe, said top hat constructed of substantially identical materials as said CIPP; and C. Curing said main pipe and said lateral pipe simultaneously by blowing air at approximately 380-470° F., at a pressure of approximately 5-20 psi, for approximately 5 to 90 minutes, wherein said CIPP and said top hat chemically bond into a unitary structure.

* * * * *